(12) United States Patent
Elangovan et al.

(10) Patent No.: US 10,957,133 B2
(45) Date of Patent: Mar. 23, 2021

(54) NFC ACTIVATION OF VEHICLE ENTRY PRIVACY MODE

(71) Applicant: FORD GLOBAL TECHNOLOGIES, LLC, Dearborn, MI (US)

(72) Inventors: Vivekanandh Elangovan, Canton, MI (US); Aaron DeLong, Toledo, OH (US); Ali Hassani, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 61 days.

(21) Appl. No.: 16/522,339

(22) Filed: Jul. 25, 2019

(65) Prior Publication Data
US 2021/0027558 A1 Jan. 28, 2021

(51) Int. Cl.
*G07C 9/00* (2020.01)
*H04W 4/80* (2018.01)

(52) U.S. Cl.
CPC .......... *G07C 9/00309* (2013.01); *H04W 4/80* (2018.02); *G07C 2009/00325* (2013.01); *G07C 2009/00547* (2013.01)

(58) Field of Classification Search
CPC ...... G07C 9/00309; G07C 2009/00317; G07C 2009/00325; G07C 2009/00349; G07C 9/00174; G07C 2009/0019; G07C 2009/00198; H04W 4/80
See application file for complete search history.

(56) References Cited

U.S. PATENT DOCUMENTS

| 9,563,998 | B2 | 2/2017 | Hoyos et al. |
| 9,783,158 | B2 | 10/2017 | Caushi |
| 9,786,108 | B2 | 10/2017 | Spiess et al. |
| 2006/0255906 | A1* | 11/2006 | Ghabra .............. G07C 9/00309 340/5.25 |

FOREIGN PATENT DOCUMENTS

DE 102017007157 A1 1/2019

\* cited by examiner

*Primary Examiner* — Curtis B Odom
(74) *Attorney, Agent, or Firm* — Frank L. Lollo; Brooks Kushman P.C.

(57) ABSTRACT

A vehicle includes a keypad including a near-field communication (NFC) sensor, and a processor. The processor is programmed to operate in a normal mode of operation, in which remote keyless entry (RKE) or passive-entry passive-start (PEPS) functions are allowed; operate in a privacy mode of operation, in which the RKE or PEPS functions are disallowed; responsive to detection of an authorized access device via the NFC sensor while in the normal mode, and to receipt of a lock command within a predetermined time from the detection of the access device, transition from the normal mode to the privacy mode; and responsive to detection of the authorized access device via the NFC sensor while in the privacy mode, transition from the privacy mode to the normal mode.

20 Claims, 3 Drawing Sheets

NFC ACTIVATION OF VEHICLE ENTRY PRIVACY MODE

TECHNICAL FIELD

Aspects of the disclosure generally relate to the use of near-field communication (NFC) to provide entry into a privacy mode in which no remote keyless entry (RKE) or passive-entry passive-start (PEPS) functions are allowed.

BACKGROUND

Vehicle key fobs may be used to allow a user to gain access to a vehicle. Some fob devices operate such that when a button is pressed on the fob, the device sends a code to the vehicle to instruct the vehicle to unlock the vehicle. PEPS key fobs operate to provide response to a challenge pulse train sent by the vehicle, where if a proper response is received by the vehicle then the door may be unlocked by a user grasping the door handle.

Phone-as-a-key (PaaK) systems are being introduced to allow users to utilize their phones to unlock a vehicle without requiring a key fob device. These systems may operate similar to a key fob, but where the phone communicates with the vehicle over BLUETOOTH LOW ENERGY (BLE) or other mobile device wireless technologies.

Keypads may be positioned on the exterior of a vehicle and may also be used to lock and unlock the vehicle. The driver may unlock the door in response to successfully inputting a factory code on the keypad, which is a code including a sequence of numbers or other such characters. The driver may also use the factory code to program a new code, sometimes referred to as a personalized code, which may be easier to remember than the factory code and usable to unlock the vehicle with the keypad.

SUMMARY

In a first illustrative embodiment, a vehicle includes a keypad including a near-field communication (NFC) sensor, and a processor. The processor is programmed to operate in a normal mode of operation, in which remote keyless entry (RKE) or passive-entry passive-start (PEPS) functions are allowed; operate in a privacy mode of operation, in which the RKE or PEPS functions are disallowed; responsive to detection of an authorized access device via the NFC sensor while in the normal mode, and to receipt of a lock command within a predetermined time from the detection of the access device, transition from the normal mode to the privacy mode; and responsive to detection of the authorized access device via the NFC sensor while in the privacy mode, transition from the privacy mode to the normal mode.

In a second illustrative embodiment, a method includes, transitioning, from a normal mode in which remote keyless entry (RKE) or passive-entry passive-start (PEPS) functions are allowed to a privacy mode in which RKE or PEPS functions are disallowed, responsive to (i) detection of an authorized access device via a near-field communication (NFC) sensor of a keypad of a vehicle and receipt of a lock command within a predetermined time from the detection of the access device, (ii) entry of a predefined combination into the keypad for a predefined period of time, or (iii) detection via the NFC sensor of an authorized access device predesignated as invoking the privacy mode; and responsive to detection of the authorized access device via the NFC sensor when in the privacy mode, transitioning from the privacy mode to the normal mode.

In a third illustrative embodiment, a non-transitory computer-readable medium includes instructions that, when executed by a processor of a controller of a vehicle, cause the vehicle to, transition, from a normal mode in which remote keyless entry (RKE) or passive-entry passive-start (PEPS) functions are allowed to a privacy mode in which RKE or PEPS functions are disallowed, responsive to (i) detection of an authorized access device via a near-field communication (NFC) sensor of a keypad of a vehicle and receipt of a lock command within a predetermined time from the detection of the access device, (ii) entry of a predefined combination into the keypad for a predefined period of time, or (iii) detection via the NFC sensor of an authorized access device predesignated as invoking the privacy mode; and responsive to detection of the authorized access device via the NFC sensor when in the privacy mode, transition from the privacy mode to the normal mode.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The advent of Phone-as-a-Key (PaaK) has driven the need for NFC access readers in the vehicle. Example use cases for NFC vehicle access systems include being a backup for when the phone has insufficient battery, and enablement of a more user-friendly valet mode that does not involve coded ignition. Additionally, valet mode may be enhanced by allowing a valet to locate the vehicle quickly with an NFC card. In some examples, this may be addressed by integrating RKE and NFC functionality into a single fob device. The combined device may then be given to the valet, who may use the RKE functionality to locate the vehicle.

NFC systems may additionally be used to combat vehicle theft. Relay attacks and using the panic button on a stolen fob are common mechanisms for quickly stealing a vehicle. However, the NFC functionality of the fob may be used to prevent these security issues by granting a seamless way to activate and deactivate a privacy mode. More specifically, a privacy mode may be introduced whereby RKE/PEPS functionality and welcome mode signaling operations are disallowed. (Welcome mode refers to functionality where a vehicle's lights may illuminate, or sounds may be played, responsive to a user unlocking or approaching the vehicle.) By causing the vehicle to enter the privacy mode, the user may be afforded a seamless way to lock the vehicle without fear of relay attack or having someone steal the fob and use the panic button to quickly identify the vehicle for theft. Additionally, the privacy mode may have an added benefit of reducing key off load. Yet further, when the vehicle enters the privacy mode, the vehicle may send its current location coordinates to the user's phone to facilitate returning to the location of the vehicle. Exiting privacy mode may be accomplished using the built-in NFC in the fob to unlock the car. In another example, the privacy mode may be exited using biometric access (e.g., whereby external face recognition could grant usage of RKE/PEPS for the duration the face is recognized). Further aspects of the disclosure are discussed in detail below.

Figure 1:
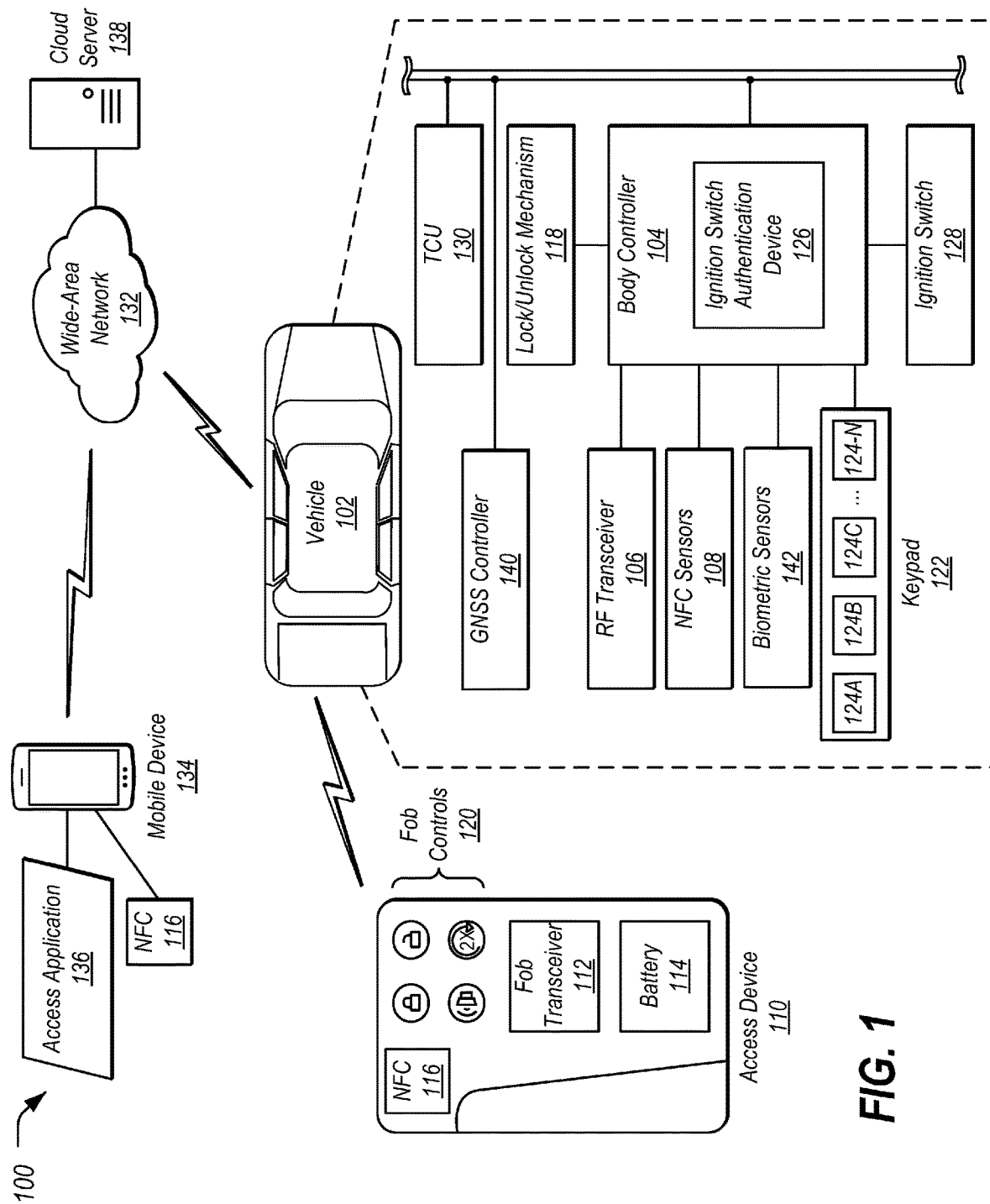
FIG. 1 illustrates an example keyless entry system for a vehicle implementing a vehicle entry privacy mode.

FIG. 1 illustrates an example keyless entry system 100 for a vehicle 102 implementing a vehicle entry privacy mode. The system 100 may include a body controller 104 in communication with a radio frequency (RF) transceiver 106 and also NFC sensors 108. An access device 110 may be in communication with the RF transceiver 106 utilizing an access transceiver 112 powered by a battery 114, and/or with the NFC sensors 108 using NFC 116 functionality of the access device 110. In one example, the NFC sensors 108 may include one or more sensors on the exterior of the vehicle which may be used in conjunction with the access device 110 to unlock or lock the vehicle 102 using NFC. Additionally or alternately, the NFC sensors 108 may further include NFC sensors 108 within the vehicle which may be used in conjunction with the access device 110 to start the vehicle 102.

A lock/unlock mechanism 118 may be operably coupled to the controller 104. The controller 104 may be configured to control the lock/unlock mechanism 118 to unlock/lock doors of the vehicle 102 in response to the RF signals transmitted by the access device 110. The access device 110 may include one or more access controls 120, such as a lock switch and an unlock switch. Accordingly, the controller 104 may control the lock/unlock mechanism 118 to lock the doors of the vehicle 102 in response to a user depressing a lock control 120 of the access device 110, and to unlock the doors of the vehicle 102 in response to the user depressing an unlock control 120 of the access device 110. Additionally, the controller 104 may control the lock/unlock mechanism 118 to unlock the doors responsive to receipt of a signal from the exterior NFC sensors 108 indicative of presence of the NFC 116 functionality of the access device 110.

The access device 110 may be implemented in connection with a base remote entry system, a PEPS system or a passive anti-theft system (PATS). With the PEPS system, the controller 104 may control the lock/unlock mechanism 118 to unlock the door in response to the controller 104 determining that the access device 110 is a predetermined distance away from the vehicle 102. In such a case, the access device 110 automatically (or passively) transmits encrypted RF signals (e.g., without user intervention) in order for the controller 104 to decrypt (or decode) the RF signals and to determine whether the access device 110 is within the predetermined distance and is authorized. It is to be noted that with the PEPS implementation, the access device 110 also generates RF signals which correspond to encoded lock/unlock signals in response to a user depressing a lock control 120 or an unlock control 120. In addition, with the PEPS system, a physical key may not be needed to start the vehicle 102. The user in this case may be required to depress the brake pedal switch or perform some predetermined operation prior to depressing a start switch after the user has entered into the vehicle 102. In the PATS implementation, the access device 110 may operate as a conventional key fob in order to lock/unlock the vehicle 102. With the PATS implementation, a physical key (not shown) is generally needed to start the vehicle 102. The key may include a RF transmitter embedded therein to authenticate the key to the vehicle 102.

It should be noted that in many examples herein, the access device 110 is discussed as including both PEPS/PATS functionality and also NFC functionality. However, in other cases, the NFC functionality may be standalone, or may be implemented as part of other devices. For instance, the access device 110 discussed herein may have NFC functionality implemented as a NFC card, a NFC card with RKE, a PEPS key fob with an integrated NFC chip, or a phone or other mobile device having an integrated NFC chip.

A keypad 122 may be in electrical communication with the controller 104. The keypad 122 may be positioned on an exterior portion or section of the vehicle 102. In one example, the keypad 122 may be hardwired to the controller 104. In another example, the keypad 122 may be in RF communication with the controller 104. The keypad 122 includes a plurality of mechanical pads, capacitive pads or other switches 124a-124n which correspond to numeric characters, alpha characters or any combination of alpha-numeric characters. Thus, to enter a digit of an access code, such as a personal code or factory code, the user may simply touch or push the corresponding button 124.

In an example, the keypad 122 may transmit commands via hardwired signals to the controller 104 which correspond to a sequence of numeric characters, alpha characters, or alpha-numeric characters in response to the user selecting various switches 124a-124n. In another example, the keypad 122 may transmit commands via RF signals which correspond to the alpha, numeric, or alpha-numeric characters to the controller 104 in response to the user selecting various switches 124a-124n. The controller 104 may control the lock/unlock mechanism 118 to lock/unlock the doors in response to receiving the commands, e.g., two or more signals (RF or hardwired) which correspond to a valid sequence of alpha, numeric, or alpha-numeric characters.

The controller 104 may include an ignition switch authentication device 126. The ignition switch authentication device 126 may also include an RF receiver (not shown) and an antenna (not shown) for receiving RF signals transmitted by the RF transmitters of the keys. It should be noted that in some examples, the ignition switch authentication device 126 may be implemented as a standalone controller (or module). The ignition switch authentication device 126 is configured to authenticate the particular type of mechanism used to start the vehicle 102. For example, with the PATS implementation, the key is inserted into an ignition switch 128 to start the vehicle 102. In such a case, the RF transmitter of the key transmits RF signals having encrypted data therein to the receiver of the ignition switch authentication device 126. The ignition switch authentication device 126 decrypts the data to authenticate the key prior to allowing the user to start the vehicle 102.

With a PEPS implementation, as noted above, a metal key is not needed to be turned in a key cylinder to start the vehicle 102. In such a case, the ignition switch authentication device 126 may authenticate the RF encrypted data passively transmitted by the fob transceiver 112 to allow the user to start the engine of the vehicle 102. With an NFC implementation, a key and cylinder is also not needed. Instead, the NFC 116 functionality of the access device 110 may be sensed by an NFC sensor 108 within the vehicle 102 cabin, which may cause the authentication device 126 of the body controller 104 to allow the user to start the engine of the vehicle 102.

In addition to the authentication device 126 authenticating the RF encrypted data or NFC data, the user may perform a predetermined operation (e.g., pull handle of a door, or open door, toggle the brake pedal switch, or other operation) prior to depressing a start switch to start the vehicle 102. The system 100 contemplates a number of other operations from those listed prior to depressing the start switch to start the vehicle 102.

The vehicle 102 may also include a telematics control unit (TCU) 130. The TCU 130 may include network hardware configured to facilitate communication between the vehicle and other devices of the system 100. For example, the TCU 130 may include or otherwise access a cellular modem configured to facilitate communication with a wide-area network 132. The wide-area network 132 may include one or more interconnected communication networks such as the Internet, a cable television distribution network, a satellite link network, a local area network, and a telephone network, as some non-limiting examples. As another example, the TCU 130 may utilize one or more of BLUETOOTH, Wi-Fi, or wired USB network connectivity to facilitate communication with the wide-area network 132 via a user's mobile device 134.

The mobile device 134 may include an access application 136 installed to a memory of the mobile device 134. The access application 136 may allow the user to utilize the mobile device 134 as an access device 110 to provide entry to the vehicle 102. In addition, the access application 136 may be able to receive information from the vehicle 102, e.g., transmitted from the vehicle 102 over the wide-area network 132 using the TCU 130. In an example, the access application 136 may allow the user to receive information indicative of the position of the vehicle 102, which may be determined by the vehicle 102 using a global navigation satellite system (GNSS) controller 140.

The vehicle 102 may also include one or more biometric sensors 142. These may include, as some examples, a fingerprint scanner configured to identify a fingerprint, a camera configured to identify facial or other features, or an audio system configured to identify a voiceprint. In some examples, the biometric sensors 142 may be used to identify a user to provide access to the vehicle 102.

Relay attacks and using the panic button on a stolen access device 110 are common mechanisms for quickly stealing a vehicle 102. However, the NFC 116 functionality of the access device 110 may be used to prevent these security issues by granting a seamless way to activate and deactivate a privacy mode. The privacy mode may be defined as a full access mode that has no welcome mode, RKE or PEPS functionality, and with the security system engaged. The privacy mode may accordingly offer additional privacy to customers who are worried about having their vehicle 102 easily stolen if a thief manages to obtain the access device 110 (or perform a relay attack) and utilizing those features to quickly locate the vehicle 102. To avoid these concerns, the RF radio module functionality may be disabled. It should be noted that the TCU 130 of the vehicle 102 may remain active to allow for communication between the vehicle 102 and mobile devices 134 via a vehicle cloud server 138.

The privacy mode may be activated in various ways. In one example, the access device 110 including NFC 116 functionality may be placed at the exterior keypad 122, which may include an NFC sensor 108, and a valid lock command may then be performed using the access device 110, keypad 122, or door switch. In some cases, the lock command must be performed within a predefined period of time from placing the access device 110 at the NFC sensor 108 (e.g., within three seconds, within five seconds, etc.), while in other cases the lock command may be performed any time at which the access device 110 is detected by the NFC sensor 108. In another example, the privacy mode may be activated by holding a unique combination of the buttons 124 of the keypad 122. As one example, the unique combination may be holding down the "1" and "5" buttons simultaneously. In some cases, the unique combination must be performed for a predefined period of time (e.g., for three second, for five seconds, etc.). In yet a further example, the privacy mode may be activated by pressing a button or button sequence on the access device 110 while the vehicle 102 is off. As another possibility, the privacy mode may be requested by a user via the user's mobile device 134, where the mobile device includes NFC 116 functionality to communicate the desire to enter privacy mode to the vehicle 102 via the NFC sensors 108. For instance, the user may hold the mobile device 134 to an NFC sensor 108 on the exterior of the vehicle 102 and may select to enter privacy mode from a vehicle access application 136 executed by the mobile device 134.

To provide confirmation to the user, the body controller 104 of the vehicle 102 may command the lock/unlock mechanism 118 to unlock the driver door in response to the NFC tap, then perform a lock using the lock/unlock mechanism 118 along with a horn chirp to indicate arming of the alarm. The vehicle 102 may further send its current location to the user's mobile device 134, which may be useful in aiding the user in finding the vehicle 102 (especially since the user would be unable to use the alarm button on the access device 110 to cause the vehicle 102 to signal its location). If the vehicle 102 is in an identified parking lot or structure, dead reckoning may be utilized to track the user's path from the vehicle 102 to the parking area exit for additional assistance in returning to the vehicle 102.

To exit the privacy mode, the access device 110 may be placed at the exterior NFC sensor 108. If desired, the user may also select in the settings of the vehicle 102 to make privacy mode persistent. For instance, when made persistent the RKE/PEPS system may not be reactivated until the user starts the vehicle 102 and expressly deactivates the privacy mode within the settings of the vehicle 102. As another possibility, the persistent privacy mode may be exited by logging into a mobile application executed by the access device 110 and disabling an option for persistent privacy mode.

Figure 2:
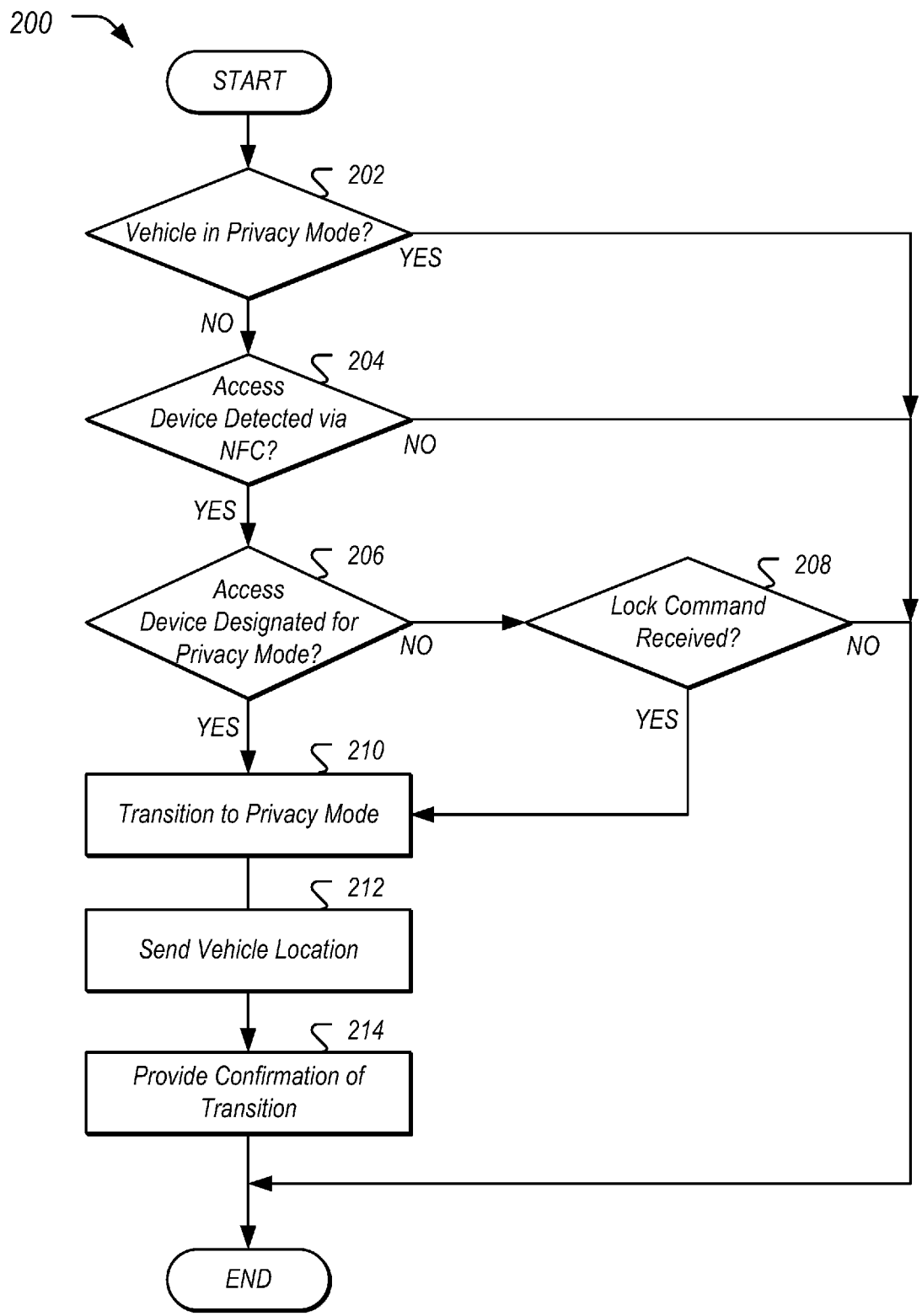
FIG. 2 illustrates an example process for entering the privacy mode.

FIG. 2 illustrates an example process 200 for entering the privacy mode. In an example, the process 200 may be performed by the body controller 104 of the vehicle 102 in the context of the system 100.

At operation 202, the vehicle 102 identifies whether the vehicle 102 is in privacy mode. In an example, the body controller 104 may access status information stored to a memory that is indicative of whether or not the vehicle 102 is in the privacy mode. If the vehicle 102 is not in the privacy mode, control passes to operation 204. Otherwise, as the vehicle 102 is already in the privacy mode, the process 200 ends.

At 204, the vehicle 102 identifies whether the access device 110 is detected via NFC. In an example, NFC sensors 108 on the exterior of the vehicle 102 may be used by the body controller 104 to monitor for presence of an access device 110. In one example, the access device 110 may be placed at an exterior keypad 122 including the NFC sensor 108. For instance, the access device 110 may be one of various devices having NFC 116 functionality, such as a NFC card, a NFC card with RKE, a key fob with an integrated NFC chip, or a mobile device 134 having an integrated NFC 116 chip. If the access device 110 is detected and is determined by the body controller 104 to be authorized to access the vehicle 102, control passes to operation 206. If not, the process 200 ends.

At operation 206, the vehicle 102 determines whether the detected access device 110 is predesignated for privacy mode. In an example, an access device 110 may be selected or otherwise indicated by a user via the vehicle 102 human-machine interface (HMI) as being a device that when used to lock the vehicle 102 automatically invokes privacy mode. In another example, an access device 110 may designate to the vehicle 102 that it is of a type that is predesignated for privacy mode, such as a specific secure key. If the access device 110 is predesignated for privacy mode, control passes to operation 210. Otherwise, control passes to operation 208.

The vehicle 102 identifies whether a lock command is received at 208. In an example, a valid lock command may be performed using the access device 110, keypad 122, or door switch. As mentioned above, the lock command must be performed within a predefined period of time from placing the access device 110 at the NFC sensor 108 (e.g., within three seconds, within five seconds, etc.), while in other cases the lock command may be performed any time at which the access device 110 is detected by the NFC sensor 108. In another example, the privacy mode may be activated by holding a unique combination of the buttons 124 of the keypad 122. As one example, the unique combination may be holding down the "1" and "5" buttons simultaneously. In some cases, the unique combination must be performed for a predefined period of time (e.g., for three second, for five seconds, etc.). In yet a further example, the privacy mode may be activated by pressing a button or button sequence on the access device 110 while the vehicle 102 is off. As another possibility, the privacy mode may be requested by a user via the user's mobile device 134, where the mobile device 134 includes NFC 116 functionality to communicate the desire to enter privacy mode to the vehicle 102 via the NFC sensors 108. For instance, the user may hold the mobile device 134 to an NFC sensor 108 on the exterior of the vehicle 102 and may select to enter privacy mode from the access application 136 executed by the mobile device 134. If a lock command is received, control passes to operation 210. Otherwise, the process 200 ends.

At operation 210, the vehicle 102 transitions to the privacy mode. In the privacy mode, RKE/PEPS functionality and welcome mode signaling operations are disallowed. By causing the vehicle 102 to enter the privacy mode, the user may be afforded a seamless way to lock the vehicle 102 without fear of relay attack or having someone steal the fob and use the panic button to quickly identify the vehicle 102 for theft. Additionally, the privacy mode may have an added benefit of reducing key off load of the vehicle 102.

At 212, the vehicle 102 sends the vehicle 102 location to the mobile device 134. In an example, the body controller 104 identifies the GNSS location of the vehicle 102 using the GNSS controller 140, and sends the GNSS location to the mobile device 134 via the TCU 130 of the vehicle 102. By sending the location to the user's mobile device 134, the user may be able to more easily return to the location of the vehicle 102.

The vehicle 102 provides confirmation of the transition to the privacy mode at operation 214. In one example, the body controller 104 of the vehicle 102 may direct the vehicle to generate a horn chirp to indicate arming of the alarm in the privacy mode. After operation 214, the process 200 ends.

Figure 3:
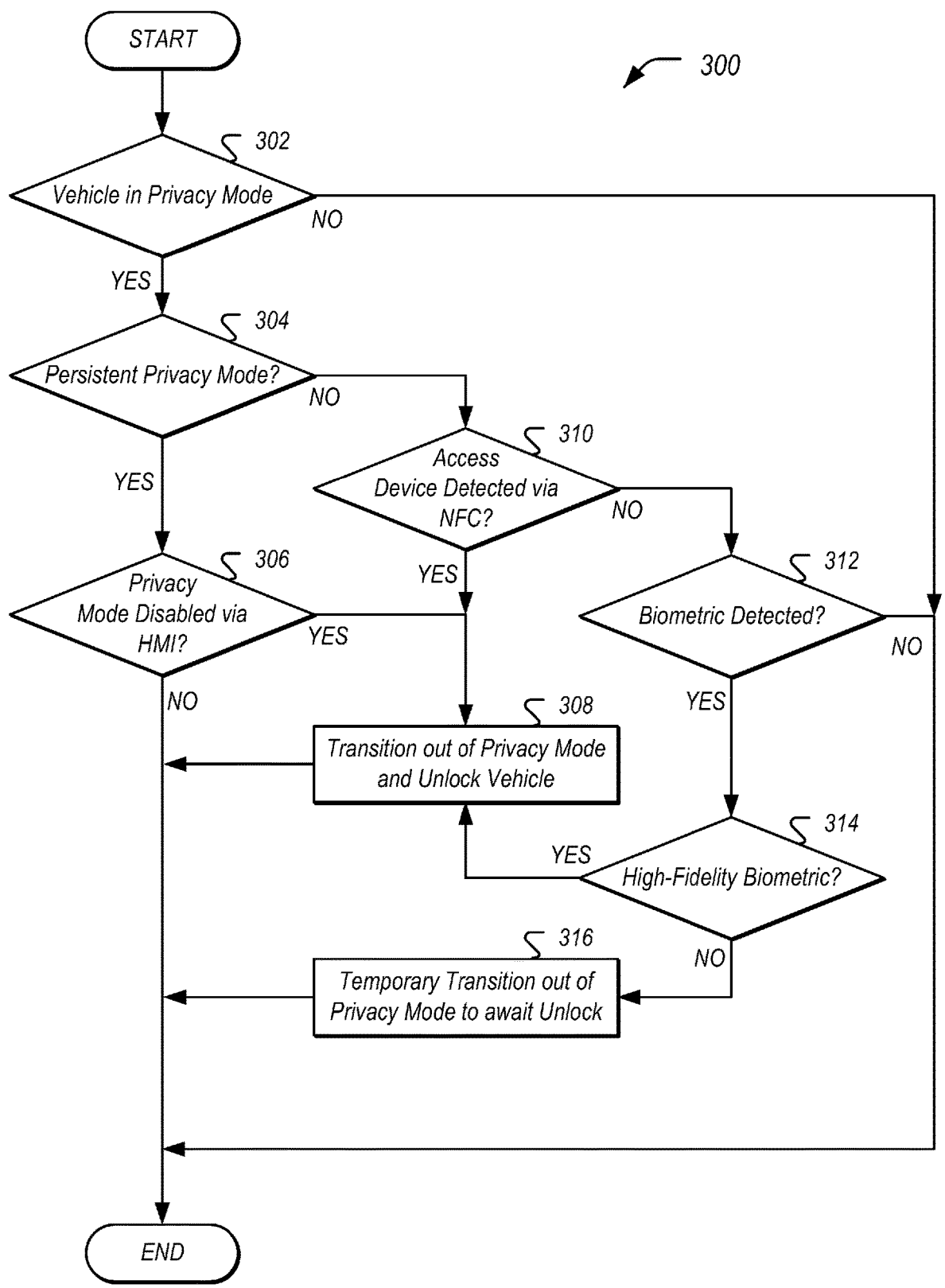
FIG. 3 illustrates an example process for exiting the privacy mode.

FIG. 3 illustrates an example process 300 for exiting the privacy mode. In an example, as with the process 200 the process 300 may be performed by the body controller 104 of the vehicle 102 in the context of the system 100.

At operation 302, the vehicle 102 identifies whether the vehicle 102 is in privacy mode. In an example, the body controller 104 may access status information stored to a memory that is indicative of whether or not the vehicle 102 is in the privacy mode. If the vehicle 102 is in the privacy mode, control passes to operation 304. Otherwise, as the vehicle 102 is not in the privacy mode, the process 300 ends.

The vehicle 102 determines, at 304, whether the vehicle 102 is in persistent privacy mode. In an example, the body controller 104 may access settings of the vehicle 102 to determine whether privacy mode was set to persistent mode in which the RKE/PEPS functionality may not be reactivated until the user starts the vehicle 102 and expressly deactivates the privacy mode within the settings of the vehicle 102. If persistent privacy mode is set, control passes to operation 306. Otherwise, control passes to operation 310.

At operation 306, the vehicle 102 determines whether a request has been received to exit the privacy mode. In an example, via the vehicle 102 human-machine interface (HMI) a user may select to turn off persistent privacy mode. As another possibility, the persistent privacy mode may be exited by logging into a mobile application executed by the access device 110 and disabling an option there for persistent privacy mode. If persistent privacy mode is exited, control passes to operation 308. If not, the process 300 ends.

At 308, the vehicle 102 transitions out of the privacy mode. Once out of the privacy mode, RKE/PEPS functionality of the vehicle 102 may be reactivated. Moreover, the vehicle 102 may also be unlocked. After operation 308, the process 300 ends.

At 310, the vehicle 102 determines whether a request via NFC has been received to exit the privacy mode. In an example, the access device 110, such as a fob, NFC card, or mobile device 134, may be placed at the exterior NFC sensor 108. If so, and the controller 104 determines that the access device 110 is authorized for the vehicle 102, control passes to operation 308 to exit from privacy mode. Otherwise, control passes to operation 312.

At operation 312, the vehicle 102 determines whether a request via biometrics has been received to exit the privacy mode. In an example, the user of the vehicle 102 may input a biometric, such as a face scan or a fingerprint, to a biometric sensor 142 of the vehicle 102. The controller 104 may further verify that the biometric indicates an authorized user for the vehicle 102. If a biometric of an authorized user is received, control passes to operation 314. If no such authorized biometric is detected, the process 300 ends.

At 314, the vehicle 102 determines whether the biometric is a high-fidelity biometric or a low-fidelity biometric. Low-fidelity biometrics may temporarily disable privacy mode to allow RKE or PEPS. High-fidelity biometrics may directly unlock the vehicle and exit privacy mode in totality. The high-fidelity biometrics may include biometrics with a high probability of being the user or that are difficult to fake, while the low-fidelity biometrics may include biometrics with a lower probability of being the user or that are less difficult to fake. In one example, the high-fidelity biometrics may include fingerprint or iris scans, while the low-fidelity biometrics may include face scans. If a high-fidelity biometric was detected, control passes to operation 308 to exit from the privacy mode. Otherwise, control passes to operation 316.

At operation 316, the vehicle 102 temporarily exits from privacy mode. This causes the vehicle 102 to reenable RKE or PEPS functionality for a predefined period of time (e.g., 30 seconds, one minute, three minutes, etc.) to allow the user to use a key fob or other wireless access device 110 to gain entry to the vehicle 102. As compared to detection of a high-fidelity biometric however, the vehicle 102 is not unlocked and the privacy mode is not permanently turned off. After operation 316, the process 300 ends.

Computing devices described herein, such as the body controller 104, access device 110, and mobile device 134, generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, JAVA™, C, C++, C#, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a near-field communication (NFC) sensor, and
a processor programmed to
operate in a normal mode of operation, in which remote keyless entry (RKE) or passive-entry passive-start (PEPS) functions are allowed;
operate in a privacy mode of operation, in which the RKE or PEPS functions are disallowed;
responsive to detection of an authorized access device via the NFC sensor while in the normal mode, and to receipt of a vehicle lock command within a predetermined time from the detection of the access device, transition from the normal mode to the privacy mode; and
responsive to detection of the authorized access device via the NFC sensor while in the privacy mode, transition from the privacy mode to the normal mode.

2. The vehicle of claim 1, wherein the processor is further programmed to direct a horn of the vehicle to chirp responsive to the transition from the normal mode to the privacy mode.

3. The vehicle of claim 1, wherein the processor is further programmed to send a location of the vehicle to a mobile device responsive to the transition from the normal mode to the privacy mode.

4. The vehicle of claim 1, further comprising a keypad, wherein the lock command includes entry of a predefined combination into the keypad for a predefined period of time.

5. The vehicle of claim 1, wherein the lock command includes communication, from a mobile device and received via the NFC sensor, of selection to enter privacy mode from an access application executed by the mobile device.

6. The vehicle of claim 1, wherein the processor is further programmed to operate in a persistent privacy mode in which privacy mode can be disabled by (i) selection of a control of a human-machine interface (HMI) in an interior of the vehicle or (ii) selection of an option to remove the persistent privacy mode from a HMI of a logged-into mobile application executed by the authorized access device, but not by detection of the authorized access device.

7. The vehicle of claim 1, wherein the processor is further programmed to, responsive to detection of a biometric of an authorized user when in the privacy mode, transition from the privacy mode to the normal mode and unlock the vehicle.

8. The vehicle of claim 1, wherein the processor is further programmed to, responsive to detection of a biometric of an authorized user when in the privacy mode, temporarily transition from the privacy mode to the normal mode to allow for unlocking of the vehicle via RKE or PEPS.

9. The vehicle of claim 1, wherein the processor is further programmed to, responsive to detection of the authorized access device via the NFC sensor when in the normal mode, and of the authorized access device being predesignated as invoking the privacy mode, transition from the normal mode to the privacy mode regardless of receipt of the lock command.

10. The vehicle of claim 1, further comprising a keypad on an exterior of the vehicle, where in the NFC sensor is integrated into the keypad.

11. A method comprising:
    transitioning, from a normal mode in which remote keyless entry (RKE) or passive-entry passive-start (PEPS) functions are allowed to a privacy mode in which RKE or PEPS functions are disallowed, responsive to (i) detection of an authorized access device via a near-field communication (NFC) sensor of a vehicle and receipt of a lock command within a predetermined time from the detection of the access device, (ii) entry of a predefined combination into a keypad of the vehicle for a predefined period of time, or (iii) detection via the NFC sensor of an authorized access device predesignated as invoking the privacy mode; and
    responsive to detection of the authorized access device via the NFC sensor when in the privacy mode, transitioning from the privacy mode to the normal mode.

12. The method of claim 11, further comprising one or more of:
    directing a horn of the vehicle to chirp responsive to the transition from the normal mode to the privacy mode; or
    sending a location of the vehicle to a mobile device responsive to the transition from the normal mode to the privacy mode.

13. The method of claim 11, wherein the predefined combination includes simultaneously pressing a predefined set of keys of the keypad.

14. The method of claim 11, wherein the lock command includes communication, from a mobile device received via the NFC sensor, of selection to enter privacy mode from an access application executed by the mobile device.

15. The method of claim 11, further comprising operating in a persistent privacy mode in which privacy mode can be disabled by (i) selection of a control in a human-machine interface (HMI) in an interior of the vehicle or (ii) selection of an option to remove the persistent privacy mode from a HMI of a logged-into mobile application executed by the authorized access device, but not by detection of the authorized access device.

16. The method of claim 11, further comprising, responsive to detection of a biometric of an authorized user when in the privacy mode, transitioning from the privacy mode to the normal mode.

17. A non-transitory computer-readable medium comprising instructions that, when executed by a processor of a controller of a vehicle, cause the vehicle to:
    transition, from a normal mode in which remote keyless entry (RKE) or passive-entry passive-start (PEPS) functions are allowed to a privacy mode in which RKE or PEPS functions are disallowed, responsive to (i) detection of an authorized access device via a near-field communication (NFC) sensor of a keypad of a vehicle and receipt of a lock command within a predetermined time from the detection of the access device, (ii) entry of a predefined combination into the keypad for a predefined period of time, or (iii) detection via the NFC sensor of an authorized access device predesignated as invoking the privacy mode; and
    responsive to detection, when in the privacy mode, of one or more of the authorized access device via the NFC sensor or a biometric of an authorized user, transition from the privacy mode to the normal mode.

18. The medium of claim 17, further comprising instructions that, when executed by the processor of the controller of the vehicle, cause the vehicle to, responsive to the transition from the normal mode to the privacy mode, (i) direct a horn of the vehicle to chirp and (ii) send a location of the vehicle to a mobile device.

19. The medium of claim 17, wherein the lock command includes entry of a predefined combination into the keypad for a predefined period of time in accordance with communication, from a mobile device and received via the NFC sensor, of selection to enter privacy mode from an access application executed by the mobile device.

20. The medium of claim 17, further comprising instructions that, when executed by a processor of a controller of a vehicle, cause the vehicle to operate in a persistent privacy mode in which privacy mode can be disabled by (i) selection of a control of a human-machine interface (HMI) in an interior of the vehicle or (ii) selection of an option to remove the persistent privacy mode from a HMI of a logged-into mobile application executed by the authorized access device, but not by detection of the authorized access device.

* * * * *